(12) United States Patent
Mondini

(10) Patent No.: US 11,964,784 B2
(45) Date of Patent: Apr. 23, 2024

(54) SEALING MACHINE AND METHOD FOR PACKAGING A FOOD PRODUCT

(71) Applicant: MONDINI S.R.L., Brescia (IT)

(72) Inventor: Giovanni Mondini, Cologne (IT)

(73) Assignee: MONDINI S.P.A., Brescia (IT)

( * ) Notice: Subject to any disclaimer, the term of this patent is extended or adjusted under 35 U.S.C. 154(b) by 53 days.

(21) Appl. No.: 17/681,890

(22) Filed: Feb. 28, 2022

(65) Prior Publication Data

US 2022/0281626 A1 Sep. 8, 2022

(30) Foreign Application Priority Data

Mar. 3, 2021 (IT) .................. 102021000004925

(51) Int. Cl.
*B65B 11/52* (2006.01)
*B65B 7/28* (2006.01)
(Continued)

(52) U.S. Cl.
CPC ............ *B65B 11/52* (2013.01); *B65B 7/2878* (2013.01); *B65B 25/001* (2013.01); *B65B 47/04* (2013.01); *B65B 51/10* (2013.01); *B65B 51/32* (2013.01)

(58) Field of Classification Search
CPC ......... B65B 11/52; B65B 51/10; B65B 51/32; B65B 47/04; B65B 43/59; B65B 25/001; B65B 61/00; B65B 61/28; B65B 65/00; B65B 67/02; B65B 7/164; B65B 7/2878; B65B 5/04; B65B 5/068; B65B 2220/24; B29C 66/849; B29C 66/131; B29C 66/7352; B29C 66/53461; B29C 66/81811; B29C 66/3492; B29C 66/7392;
(Continued)

(56) References Cited

U.S. PATENT DOCUMENTS 5,191,181 A 3/1993 Regenscheid
5,788,114 A * 8/1998 Perego .................. B65B 25/002
221/281
(Continued)

FOREIGN PATENT DOCUMENTS

EP 2905232 A1 * 8/2015 ........... B65B 31/028
IT PR20090088 A1 5/2011
IT JB20155300 A1 4/2017

OTHER PUBLICATIONS

Translation of EP 2905232 A1 (Year: 2015).*

*Primary Examiner* — Thomas M Wittenschlaeger
(74) *Attorney, Agent, or Firm* — PEARNE & GORDON LLP; Michelle E. Tochtrop

(57) ABSTRACT

A sealing machine and method for sealing a preformed tray (2) with a plastic film (26), the method comprising a cooling step in which, by acting on the outside of the tray (2), heat is removed at least from the bottom wall (3) of the tray (2) while the heated plastic film (26) is applied over the tray (2) and a food product (25), and the sealing machine (1) comprising a supporting element which defines a housing (7) which has a fixed bottom surface (9) suitable for making contact, in use, with the bottom wall (3) of the tray (2), a plurality of ducts (19) which define a flow path (20) for a cooling fluid in the supporting element, and a cooling system (17) configured to cool the cooling fluid bringing it to a temperature equal to or less than 10° C., and preferably equal to or less than 6° C.

20 Claims, 7 Drawing Sheets

(51) Int. Cl.
  *B65B 25/00*  (2006.01)
  *B65B 47/04*  (2006.01)
  *B65B 51/10*  (2006.01)
  *B65B 51/32*  (2006.01)

(58) Field of Classification Search
  CPC . B29C 66/112; B29C 66/8322; B29C 66/919; B29C 65/7897; B29C 65/02; B29L 2031/7164
  See application file for complete search history.

(56) References Cited

U.S. PATENT DOCUMENTS

| | | |
|---|---|---|
| 8,402,723 B2 | 3/2013 | Granili |
| 2010/0115890 A1 | 5/2010 | Granili |
| 2018/0178932 A1* | 6/2018 | Palumbo .................. B65B 5/04 |
| 2019/0375566 A1* | 12/2019 | Löffler ................ B65D 75/305 |

\* cited by examiner

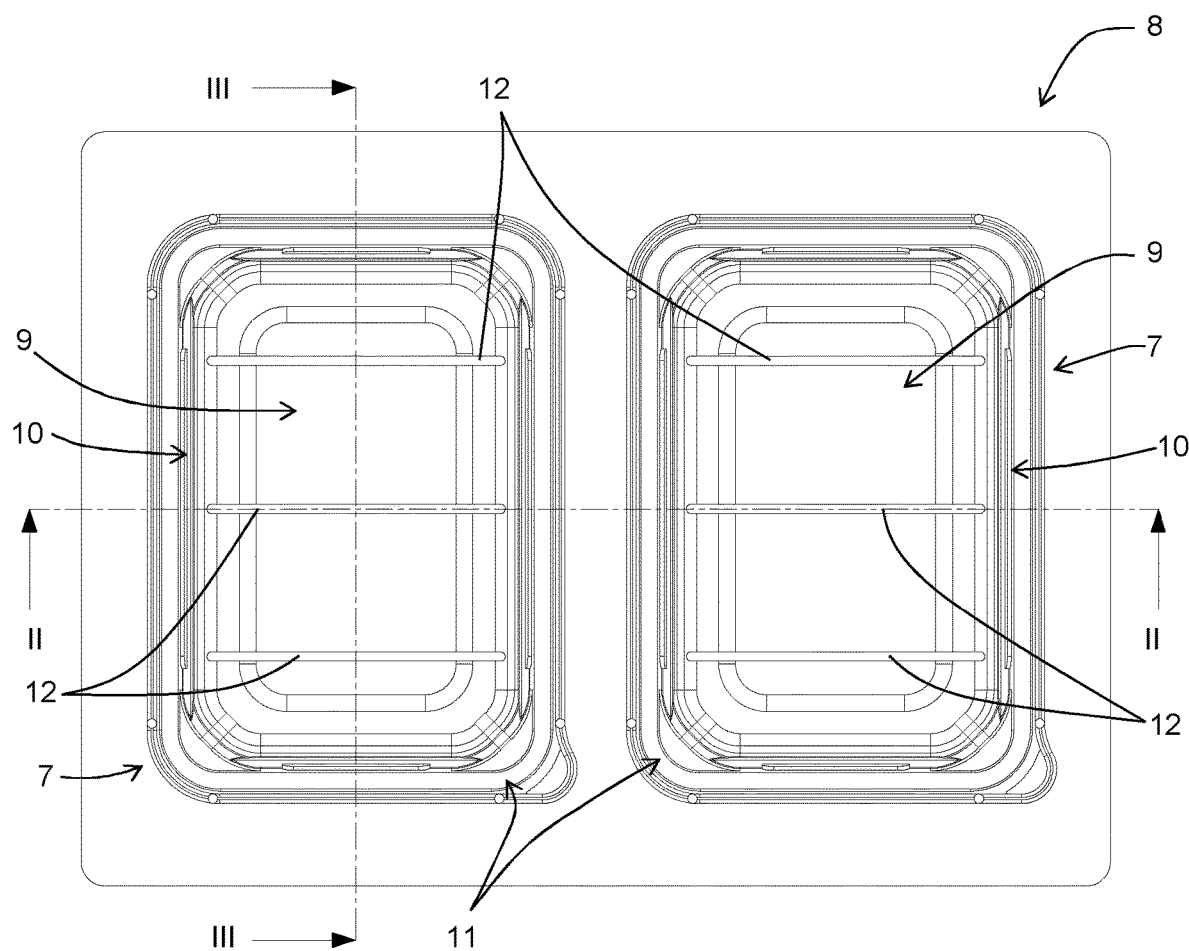
FIG: 1
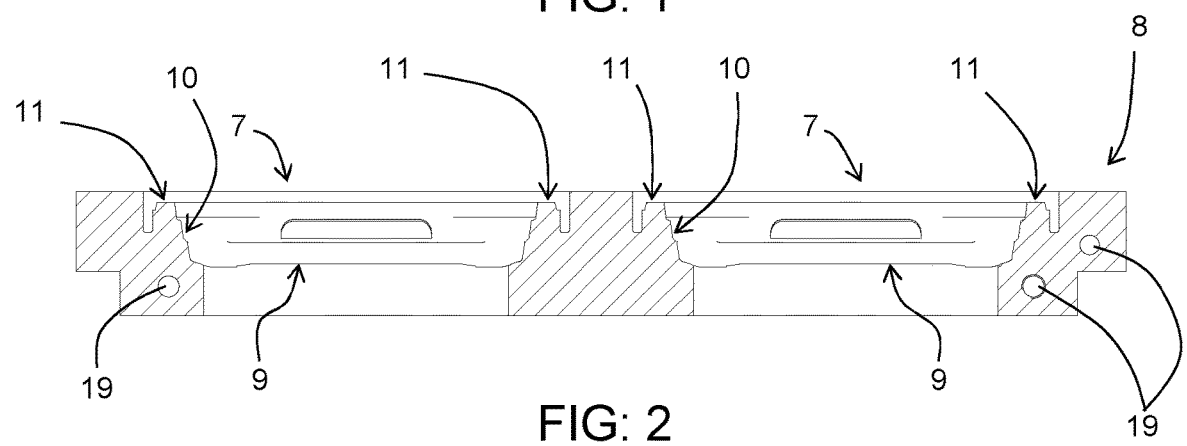
FIG: 2

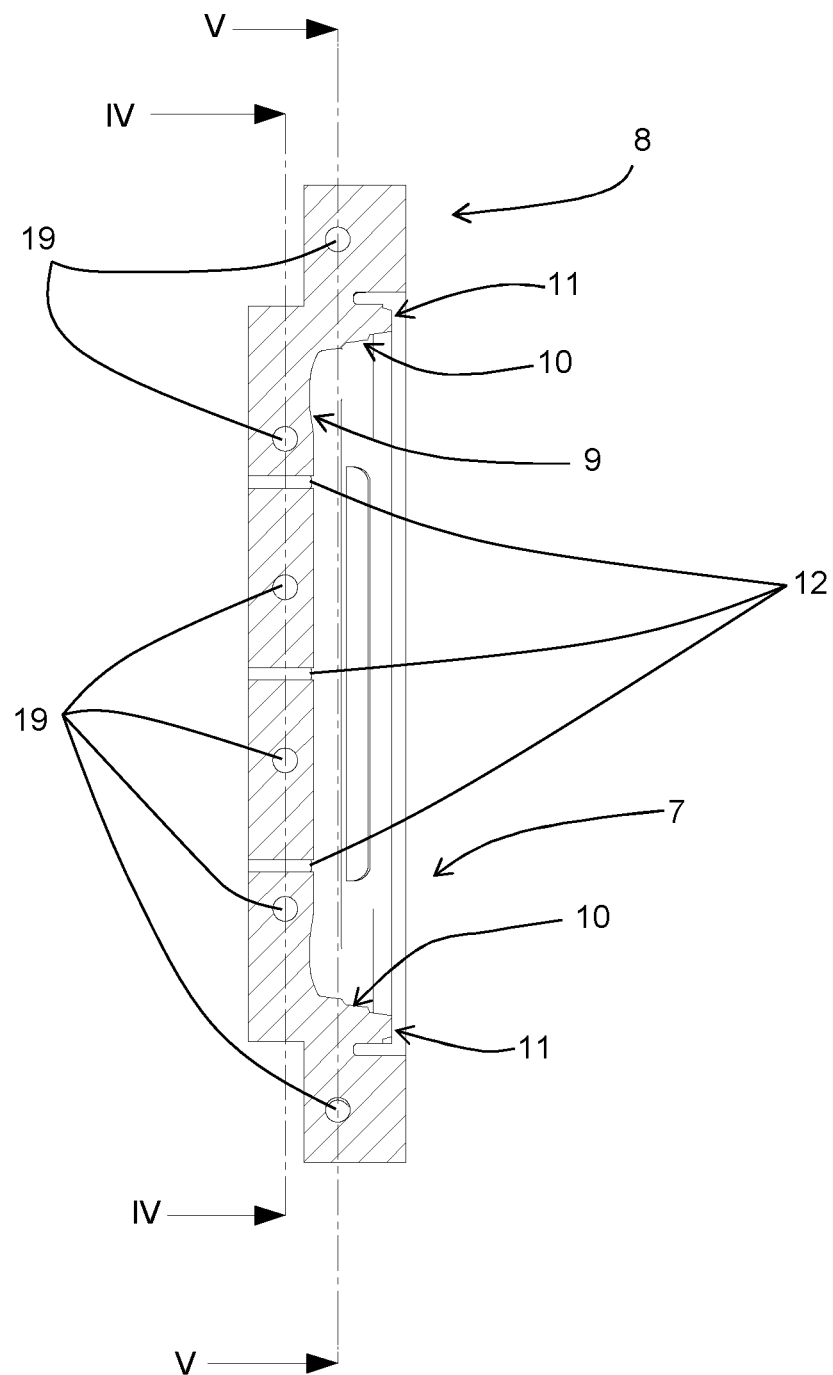
FIG: 3

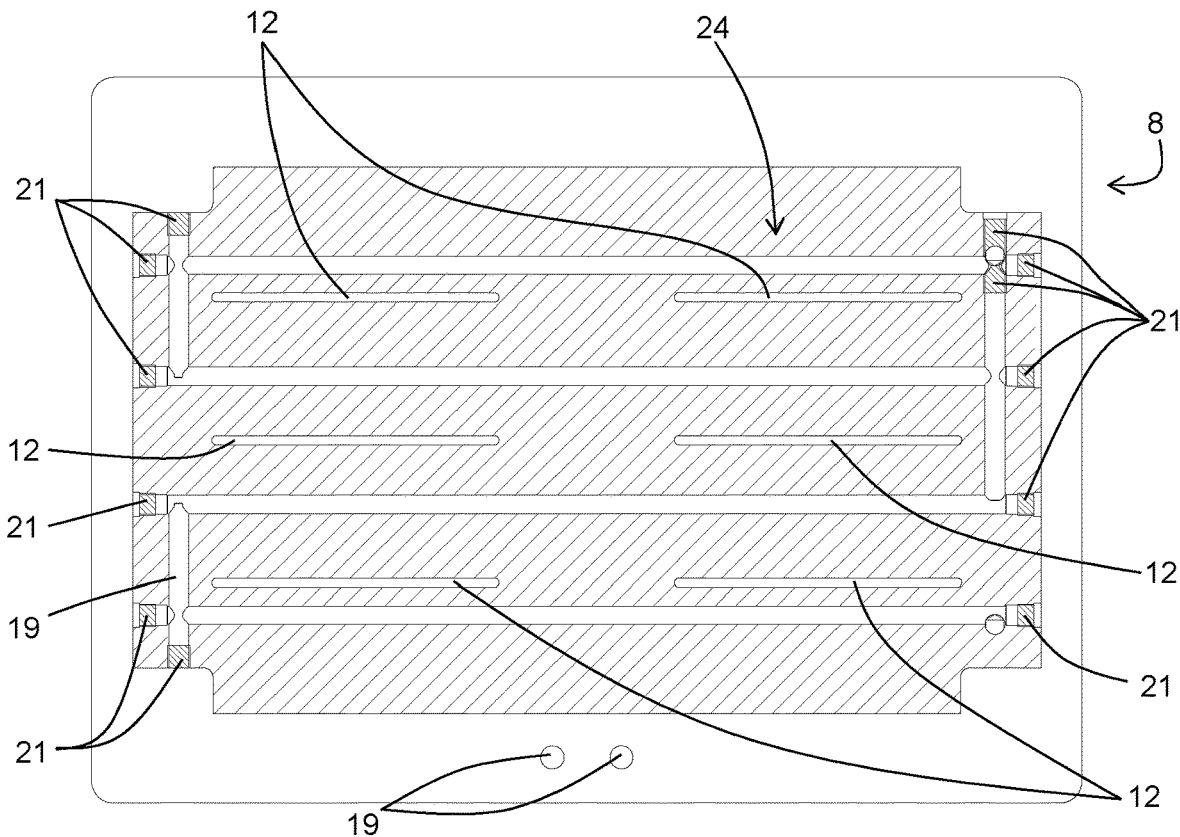
FIG: 4
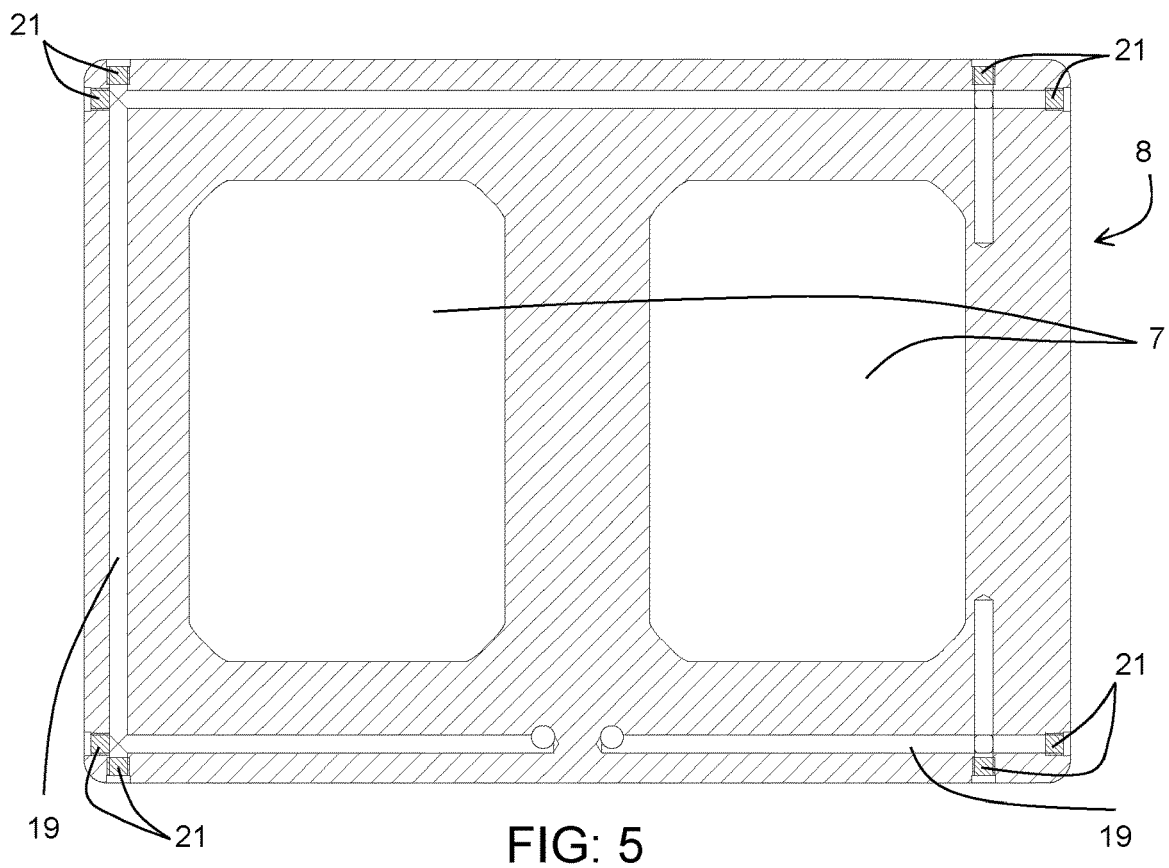
FIG: 5

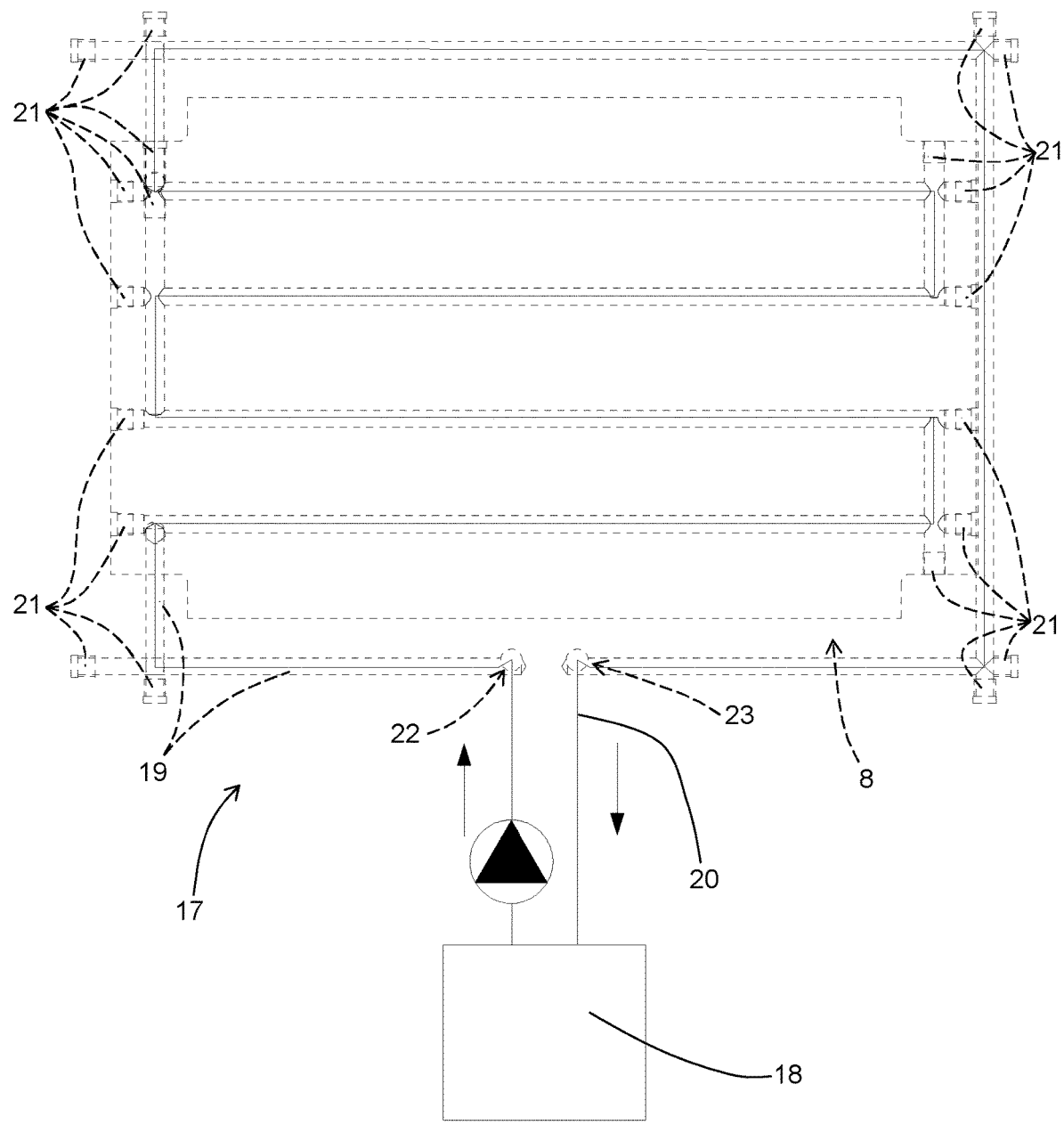
FIG: 6

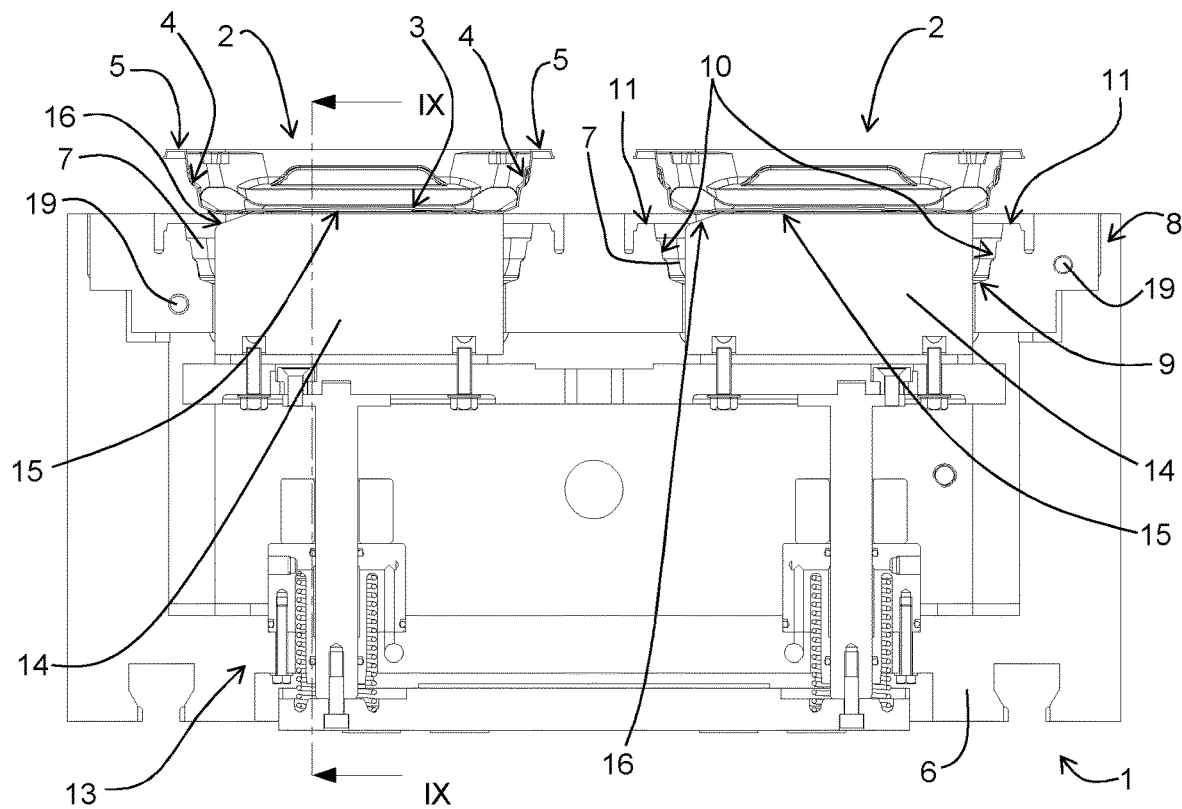
FIG: 7
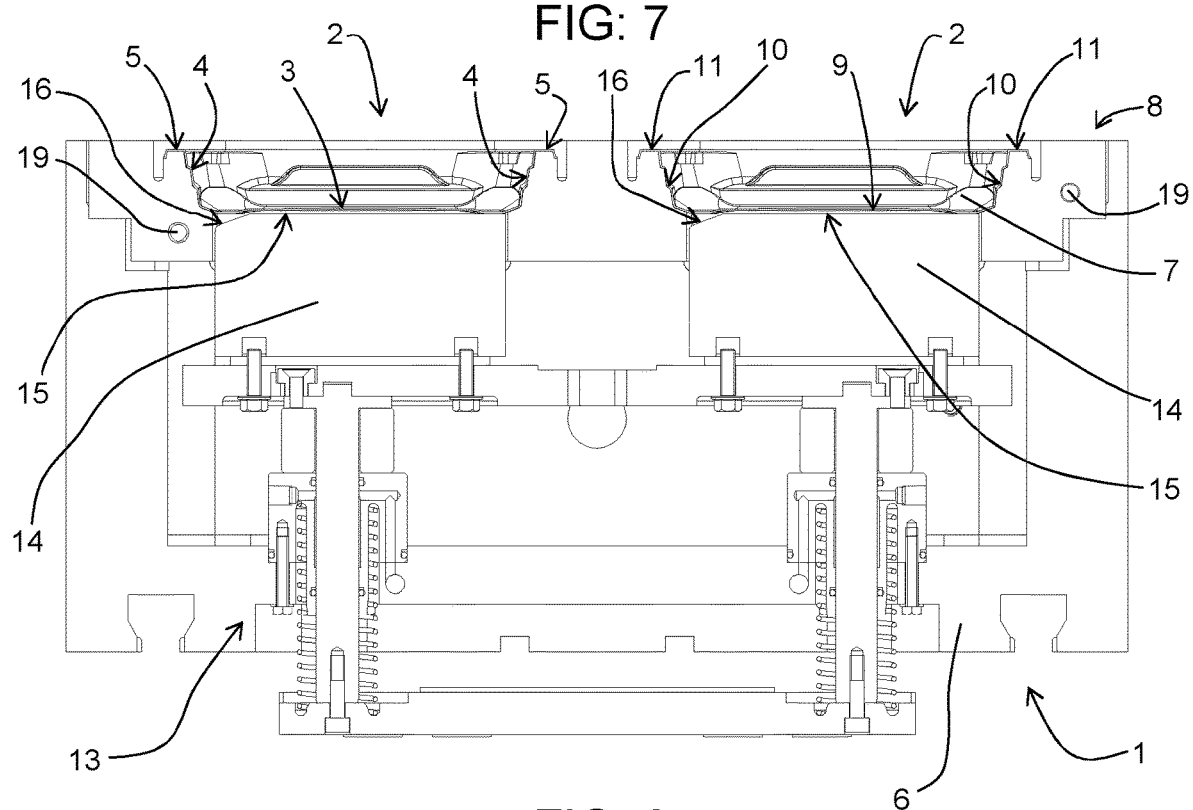
FIG: 8

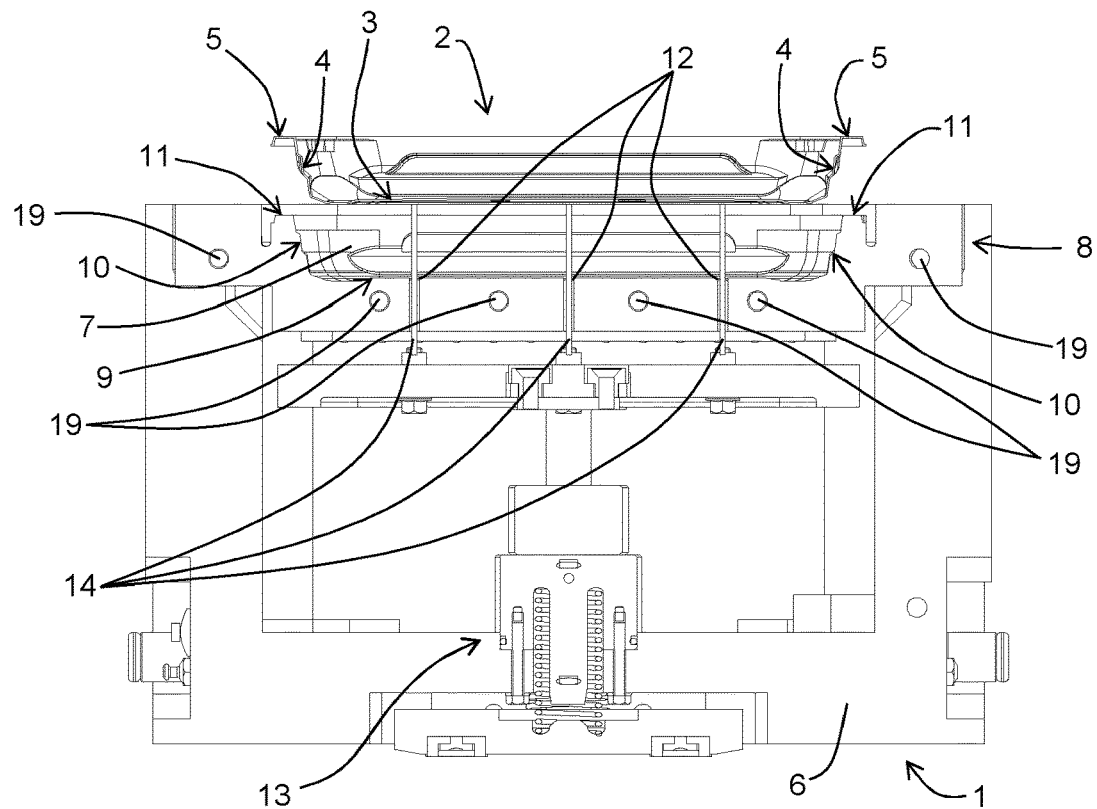
FIG: 9
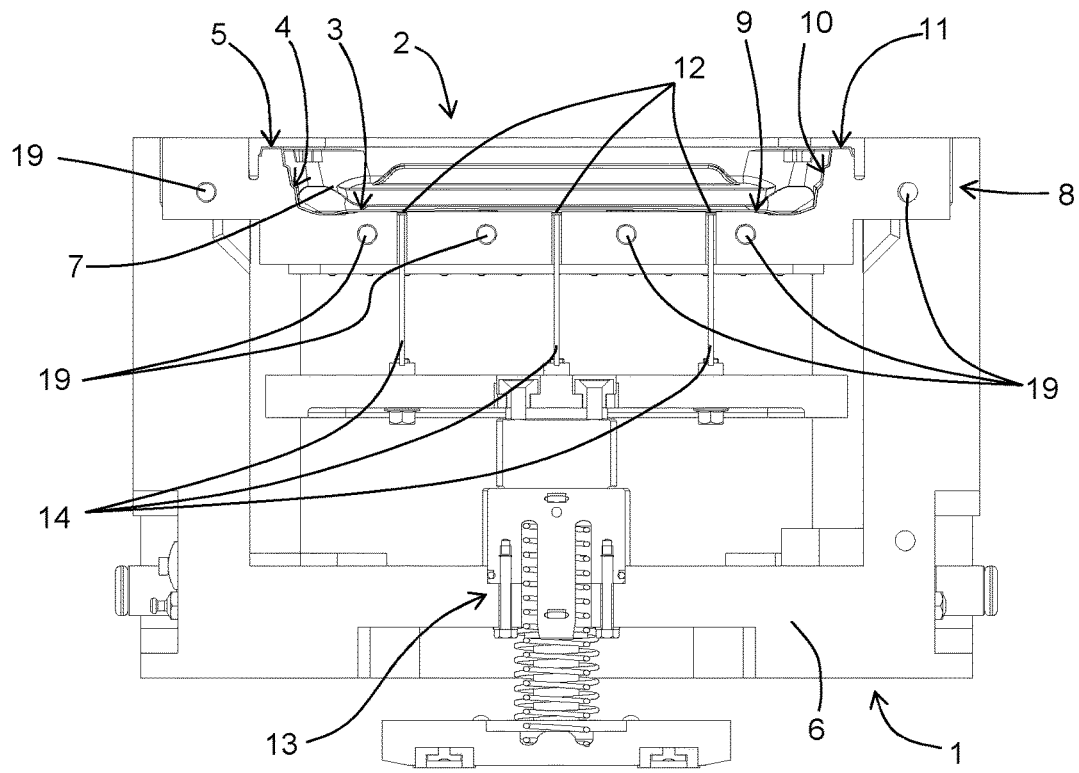
FIG: 10

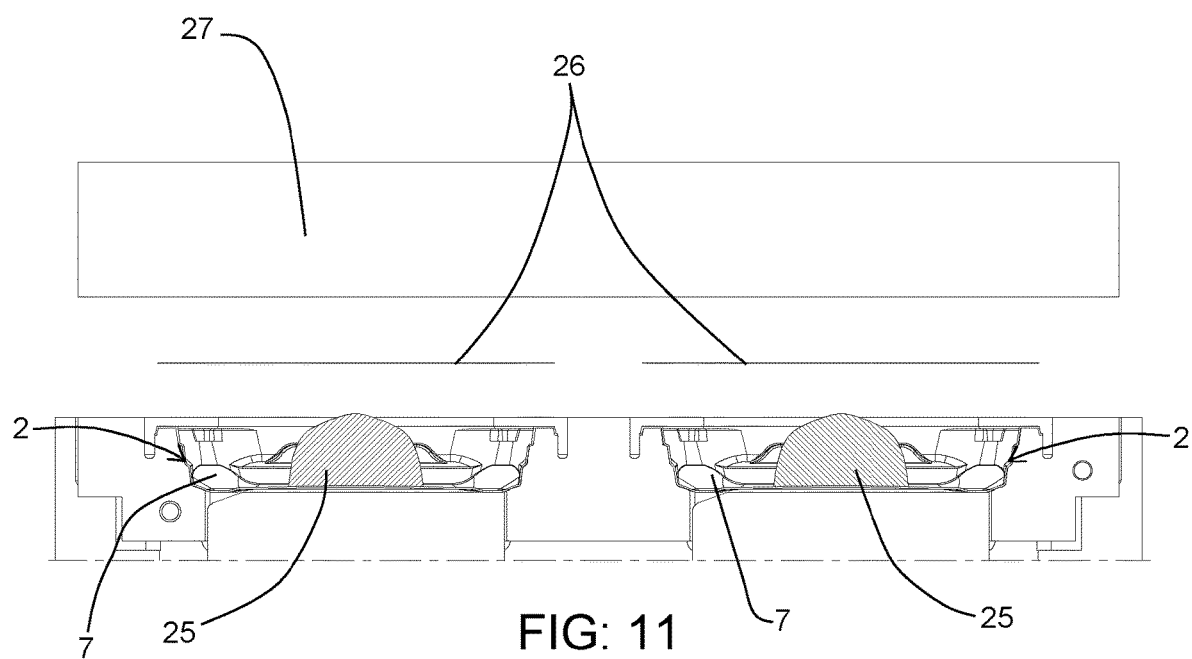
FIG: 11

SEALING MACHINE AND METHOD FOR PACKAGING A FOOD PRODUCT

This invention relates to a sealing machine and a method for packaging a food product. This invention is preferably intended for packaging fresh and perishable food products such as meat, cheeses, etc.

In particular, this invention was devised in the context of the packaging method which uses so-called skin packaging technology. Therefore, hereinafter reference will mainly be made to that packaging method. Despite that, this invention may also be applied in other types of packaging, for example that which uses MAP (Modified Atmosphere Packaging) technology.

In the context of this invention, the term sealing machine means a machine suitable for applying a protective plastic film to a tray, thereby obtaining a container in which the product is positioned between the tray and the protective plastic film and is sealed relative to the outside environment. In the packaging sector such machines are known both as sealing machines and as closing machines.

With reference to skin packaging technology, there are two main currently known techniques for sealing a container containing a food product: a first technique in which the tray of the container is created at the same time as the food product is packaged, and a second technique in which a previously created, that is to say, preformed tray is used. As is explained in more detail below, this invention relates to this second known technique.

The first known technique, typically implemented on a single line, involves the use of a first continuous film of plastic material which is thermoformed to obtain a tray but without detaching the tray from the rest of the first plastic film. The food product is then positioned on the tray. Then, still keeping the tray fixed to the rest of the first plastic film, the tray is inserted in a sealing machine which applies a second plastic film over the food product. In particular, inside a chamber defined by the sealing machine, firstly the second plastic film is positioned over the tray and the vacuum is created for removing the air present between the second plastic film and the tray. The second plastic film is heated to a temperature which allows its plastic deformation necessary to obtain the skin effect (at approximately 200° C.) and, under the effect of the pressure difference created between its two faces it is made to adhere to the tray below and to the food product. At the same time, the second plastic film sticks to the first plastic film which constitutes the tray. Only when container sealing has ended, is there cutting of the first plastic film and the second plastic film to release the tray and the protective plastic film applied to it.

The second known technique for sealing a container with skin packaging technology in contrast involves creating the tray during a step which precedes the sealing step, and for the packaging using a preformed tray already detached from the web of first plastic film from which it was obtained. In general, in this case too, as in the previous case, the tray is at least partly obtained by thermoforming. The decision whether to adopt the first known technique or the second known technique is in general linked to the type of production desired. For large-scale production, such as that carried out by major food companies, in general it is possible to install not just a closing machine but also an in-line thermoformer; therefore, the first known technique is preferable. Otherwise, in the case of small discontinuous production runs, such as those which may be carried out inside a supermarket, or small artisan firms, use of the second known technique is inevitable since it would not be economically viable to install a thermoforming machine; purchasing preformed trays is economically preferable.

In contrast, the ways of packaging and application of the second plastic film are similar to those described above, the only difference being that, when the tray is inserted in the sealing machine, it is not connected to the film from which it was obtained, as is the case in contrast with the first known technique described above. This difference has a considerable impact on the packaging process, as explained below.

In both of the known techniques described, the sealing machine comprises a supporting element which defines a housing for the tray. At least in the case of basin-shaped trays with a bottom wall, a lateral wall and an upper flange, the supporting element comprises an annular body suitable for supporting the lateral wall and/or the upper flange, and a central body configured both to support the bottom wall during sealing, and to move the tray inside the housing. Indeed, the central body is movable relative to the annular body between a lowered position, in which it disengages from the housing and allows the presence of a tray inside the housing, and a raised position, in which it occupies the housing and can keep the tray outside (above) the housing. Shifting of the central body from the raised position to the lowered position is used to insert the tray in the housing, whilst shifting the opposite way, from the lowered position to the raised position, is used to eject the tray (and the entire container) from the housing once sealing has ended.

For packaging food products, the quantity of material which is used to make the containers is a fundamentally important aspect, since it is linked both to the packaging costs, and to the transportation costs (which are linked to the weight and volume of the container). Consequently, over time attempts have been made to continually reduce the thickness of the material used to make the containers. However, while for the upper protective plastic film it was possible to achieve very reduced thicknesses with the same packaging quality, until now a reduction in the thickness of the material which constitutes the tray encountered considerable limitations linked to the quality of the packaging obtainable, in particular as regards the aesthetics of the containers. That problem is particularly acute in the case of the second known packaging technique using skin packaging technology.

When packaging involves using supporting trays which were thermoformed starting from a first film constituted of plastic material (and this applies whether they are thermoformed during the sealing process—first known technique—, or they are thermoformed beforehand—second known technique), the heating to which the trays are subjected due to the contact with the hot second plastic film which is made to adhere to them during sealing, causes them to soften to a greater or lesser degree, which exposes them to the risk of deformations. The thinner the first plastic film is, the more it is softened; consequently, if it is too thin, the trays tend to deform either due to the memory of the plastic material which tends to return to its stretched out starting shape, or under the effect of the pull applied by the second plastic film.

The Applicant was able to establish that this problem is not as bad in the case of the first known technique in which use is successfully made of material thicknesses which are significantly less than currently possible with the second known technique. Indeed, thanks to the fact that the sealing machine applies a locking action on the portion of first plastic film which surrounds the tray, consequently keeping the tray securely stationary in the housing.

Otherwise, in the case of the second known technique, the tray is free and is not retained at its perimeter; it can therefore move more freely in the housing as well as deform.

For that reason, whereas adopting the first known technique it is possible to make the trays using plastic films with thickness reduced to around 300 μm, when the second known technique is used it is not possible to use film with thicknesses less than 500 μm, or the containers obtained could be visibly deformed and therefore not marketable.

In this context the technical purpose which forms the basis of this invention is to make a sealing machine and to provide a method for sealing a tray with a plastic film, which overcome the above-mentioned disadvantages.

In particular the technical purpose of this invention is to provide a sealing machine and a method for packaging a food product which allow the use of preformed trays (therefore in accordance with the second known technique described above) but using trays in which the thickness of the material of which they are constituted is significantly less than is currently possible with the known solutions.

The technical purpose specified and the aims indicated are substantially achieved by a sealing machine and by a method for packaging a food product as described in the appended independent claims.

In contrast, particular embodiments of this invention are defined in the corresponding dependent claims.

Further features and the advantages of this invention will be more apparent in the detailed description, with reference to the accompanying drawings which illustrate several preferred, non-limiting embodiments of a sealing machine and a method for packaging a food product, in which:

FIG. 1 shows, in a plan view, a shaped mould which is part of a sealing machine made in accordance with a preferred embodiment of this invention;

FIG. 2 shows, in a front view vertical section, the shaped mould of FIG. 1 sectioned according to the section line II-II;

FIG. 3 shows, in a side view vertical section, the shaped mould of FIG. 1 sectioned according to the section line III-III;

FIG. 4 shows, in a top view horizontal section, the shaped mould of FIG. 1 sectioned according to the section line IV-IV of FIG. 3;

FIG. 5 shows, in a top view horizontal section, the shaped mould of FIG. 1 sectioned according to the section line V-V of FIG. 3;

FIG. 6 shows, in a schematic top view, the shaped mould of FIG. 1 also showing in transparent form (broken line) ducts made inside the shaped mould, which are part of a cooling system;

FIG. 7 shows, in a front view vertical section according to the section line II-II of FIG. 1, a sealing machine which comprises the shaped mould of FIG. 1 and which is in a first operating configuration in which ejectors are in an engaged position;

FIG. 8 shows the sealing machine of FIG. 7 in a second operating configuration in which the ejectors are in a disengaged position;

FIG. 9 shows the sealing machine of FIG. 7 in a side view vertical section according to the section line IX-IX;

FIG. 10 shows the sealing machine of FIG. 9 in the configuration of FIG. 8;

FIG. 11 shows a detail of the sealing machine of FIG. 8 also showing a food product inserted in the tray, a plastic film and a closing element of the sealing machine.

In the detailed description which follows, first there is a description of the sealing machine 1 which is the subject of a first part of this invention, and then the method for packaging a food product 25 which is the subject of a second part of this invention.

What is described below with reference to the sealing machine and with reference to the method, shall be understood to also apply respectively with reference to the method and also with reference to sealing machine, if technically compatible.

This invention in general relates to making containers comprising a tray 2 and a plastic film 26 (advantageously thermoplastic) applied on the top of the tray 2, which contain the food product 25 between them.

The tray 2 comprises at least one layer of plastic material which advantageously covers substantially the entire extent of the tray 2. Preferably the tray 2 is constituted of a single sheet of plastic material which may comprise one or more layers.

In the tray 2 at least a bottom wall 3 is identifiable, usually configured to receive the food product 25. In particular the invention relates to preformed trays, that is to say, which have been completely formed, preferably by thermoforming, before their use for packaging the food product 25. That also means that if necessary the trays have been detached from the web of material from which they have been obtained.

Advantageously, the tray 2 used in the context of this invention comprises, or preferably is constituted of, a sheet of plastic material which has a thickness of less than 500 μm. In some embodiments the thickness is less than 350 μm, and preferably less than 300 μm.

In some embodiments the tray 2 also comprises at least a lateral wall 4, to the upper part of which an upper flange 5 may also be connected, which can serve both to stiffen the tray 2, and, if necessary, to create a surface on which to fix the plastic film 26.

The sealing machine 1 comprises, similarly to the prior art machines, a supporting frame 6, whose task is both to give structural stiffness to the entire sealing machine 1, and to constitute a supporting structure for the other elements which are part of the same sealing machine 1.

Similarly to the prior art machines, the sealing machine 1 according to this invention also comprises a supporting element fitted on the supporting frame 6 and which inside it defines a housing 7 configured to receive in use a tray 2. However, in accordance with a first innovative aspect of this invention, the supporting element is constituted of a shaped mould 8, shown in a top view in FIG. 1 and in two cross-sections perpendicular to each other in FIGS. 2 and 3. The food product 25 may already be present at the moment of insertion of the tray 2 in the housing 7 or it may be positioned afterwards. In the embodiment illustrated, the shaped mould 8 defines two housings, to allow simultaneous processing of two trays. In general, the shaped mould 8 will be able to define one or more housings. It shall be understood that what is described below relative to one housing 7 also applies to any other housings present in the shaped mould 8 which are each intended to house a tray 2.

The housing 7 defined by the shaped mould 8, has a bottom surface 9 which, according to a second innovative aspect of this invention, and unlike for the supporting elements used in the prior art, is fixed relative to the rest of the shaped mould 8; the bottom surface 9 is configured to make contact with the bottom wall 3 of the tray 2 when the latter is inserted inside the housing 7.

In some embodiments such as that illustrated in the accompanying figures, the housing 7 also has a lateral surface 10 configured to make contact with the lateral wall 4 of the tray 2 and, if necessary, a top surface 11 configured to make contact with the upper flange 5 of the tray 2.

In a preferred embodiment, the housing 7 has a shaped inner surface, which includes the bottom surface 9, which substantially follows the shape of the outer surface of the bottom wall 3 of the tray 2. In some embodiments the shaped inner surface may be constituted of only the bottom surface 9 (for example in the case of flat trays), whilst in other embodiments it may also comprise the lateral surface 10 and if necessary the top surface 11. If the lateral surface 10 and if necessary the top surface 11 are also present, the shaped inner surface of the housing 7 may also follow the outer surface of the lateral 4 of the tray 2 and, if necessary, of the upper flange 5 of the tray 2.

In the context of this invention, saying that the shaped inner surface of the housing 7 follows the outer surface of the tray 2 means that the shape of the shaped inner surface of the housing 7 is such that it completely or almost completely matches the shape of the outer surface of the tray 2 which must be received in the housing 7, that is to say, it means that the shaped inner surface of the housing 7 altogether has the same shape as the outer surface of the tray 2 (as its bottom wall 3 and, if necessary, the lateral wall 4 and the upper flange 5). That can advantageously be achieved by giving the shaped inner surface of the housing 7 the same shape as the inner surface of a thermoforming mould with which the tray 2 was previously made by thermoforming. However, it should be noticed that what was just indicated does not rule out that in the shaped inner surface of the housing 7 there may be localised zones in which it does not follows the outer surface of the tray 2, nor that at the shaped inner surface there may be holes such as the sliding holes 12 described below and used by the ejecting device 13, or others used to create the vacuum inside the housing 7. In general, it shall be understood that the shaped inner surface of the housing 7 follows the outer surface of the tray 2 when the two coincide at least 80%, preferably at least 90%.

The housing 7 will always have a width, a length and a depth which are measured along the three Cartesian axes perpendicular to each other. The width and length will therefore be measurable along two lines perpendicular to each other which lie in a reference plane. The line along which the depth is measured is perpendicular to the reference plane and, advantageously, corresponds to a line along which a tray 2 can be moved in order to insert it in the housing 7 and remove it from the housing 7.

Considering the tray 2 itself, resting on a flat resting surface, that flat surface extends in a lying plane of the tray 2 whose relative position is fixed relative to the tray 2. The housing 7 is advantageously made in such a way that when the tray 2 is inserted in it, the lying plane of the tray 2 is parallel to the reference plane, and, preferably, in such a way that both are horizontal.

In the preferred embodiment the shaped mould 8 is constituted of a single body constituted of one or more metal materials, preferably an aluminium-based metal material, or another material which allows the obtainment of similar heat exchange coefficients by conduction with the bottom wall 3 of the tray 2 and with a cooling fluid (in the ways described below).

Made at the bottom surface 9 of the shaped mould 8 there are one or more sliding holes 12 which, as explained in more detail below, have the function of allowing insertion of one or more ejectors 14 inside the housing 7.

In particular, in some embodiments the sliding holes 12 may have a slot-shaped cross-section. Advantageously, as can be seen for example in FIG. 1, they may have an elongate slot shape, extending for most of the width of the bottom surface 9; these sliding holes 12 with an elongate slot shape may also be symmetrical relative to at least one of the two main axes of the bottom surface 9 (the axes along which the width and the length of the bottom surface 9 are measurable in accordance with what is indicated above for the width and length of the housing 7).

As indicated above, relative to the shape of the shaped inner surface of the housing 7, the sliding holes 12 advantageously cover a limited part of the extent of the bottom surface 9.

Considering the fact that in most embodiments the bottom surface 9 extends three-dimensionally, whilst the sliding holes 12 are simply spaces in which the bottom surface 9 is not present, the preferred method for assessing the ratio between the extent of the sliding holes 12 and that of the bottom surface 9 according to this invention, consists of referring to their projections on the reference plane defined by the two lines along which the width and the length of the housing 7 are measured, that is to say, perpendicular to the line along which the depth of the housing 7 is measured. In the preferred embodiments the reference plane is advantageously horizontal. Preferably, the projections of the sliding holes 12 on the reference plane occupy altogether an area (obtained by adding together the areas of the projections on the reference plane of each sliding hole 12 present at the bottom surface 9) equal to or less than 10%, preferably equal to or less than 7%, of the area occupied by the projection of the bottom surface 9 on the same reference plane. In other words, considering the reference plane, projected onto this horizontal plane is the bottom surface 9 and the sliding holes 12 present at it, and the areas of the relative projections are measured, followed by calculation of the ratio between the total area occupied by the sliding holes 12 and the area of the bottom surface 9; as a percentage value that ratio will advantageously be equal to or less than 10%, preferably equal to or less than 7%.

The sealing machine 1 also comprises a closing element 27, associated with the shaped mould 8 and advantageously placed over the shaped mould 8 at the housing 7. The closing element 27 is movable relative to the shaped mould 8 between an operating position and a non-operating position.

When it is in the operating position, the closing element 27 is coupled to the shaped mould 8 and allows sealing of the container by application of the plastic film 26 on the tray 2 below. When the closing element 27 is coupled to the shaped mould 8, the two define an operating chamber which is advantageously fluid-tight relative to the outside environment in such a way that the vacuum can be created in it. In use, both the tray 2 (inserted in the housing 7), and the plastic film 26 to be applied to the tray 2 are positioned inside the chamber.

When it is in the non-operating position, the closing element 27 is uncoupled from the shaped mould 8 and allows access to the housing 7 and therefore insertion and/or removal of the tray 2. The features of the closing element 27, a non-characterising aspect of this invention, are known to experts in the sector, since they are similar to those of the closing elements commonly used for the sealing machines of the prior art; therefore, they are not described in detail herein. Similarly to the prior art closing elements, even the closing element according to this invention is associated with heating means suitable for heating the plastic film 26 contained in the operating chamber, before it is applied to the tray 2.

The sealing machine 1 according to this invention also includes an ejecting device 13 which is associated with the housing 7 made in the shaped mould 8, and which allows ejection of the tray 2 from the housing 7 at the end of the sealing process (or before the end of the process in the case of unforeseen events, such as malfunctions). However, advantageously, at least in some embodiments, the ejecting device 13 may also be used to insert the tray 2 in the housing 7.

The ejecting device 13 comprises one or more ejectors 14, each of which is movable relative to the bottom surface 9 of the housing 7 between a disengaged position and an engaged position. Advantageously, all of the ejectors 14 present are movable simultaneously. However, depending on requirements, it is possible to have either simultaneous movement of all of the ejectors 14 (preferred embodiment) or a difference in the movement among the various ejectors 14. When they are in the disengaged position, the ejectors 14 allow the tray 2 to be received inside the housing 7. In contrast, when they are in the engaged position, the ejectors 14 do not allow the tray 2 to be received inside the housing 7. The shifting of the ejectors 14 from the disengaged position to the engaged position causes the ejection of any tray 2 which may be present in the housing 7. Vice versa, the passage from the engaged position to the disengaged position can be used for controlled insertion of a tray 2 in the housing 7 (the tray 2 will have to be correctly positioned beforehand on the ejectors 14 which are placed in the engaged position).

At least one of the ejectors 14 is also fitted in each sliding hole 12 made at the bottom surface 9; in particular preferably associated with each sliding hole 12 there is an ejector 14 and, reciprocally, each ejector 14 is associated with only one sliding hole 12: in this way there is the same number of ejectors 14 as sliding holes 12.

In a preferred embodiment the ejectors 14 move between the disengaged position and the engaged position following a substantially vertical ejecting line, that is to say, orthogonal to the horizontal reference plane.

In one particular embodiment, each ejector 14, when located in the engaged position, is projecting inside the housing 7 relative to the bottom surface 9, whilst when it is in the disengaged position it is retracted outside the housing 7 relative to the bottom surface 9. In the embodiment illustrated, when it is in the disengaged position, each ejector 14 is positioned in such a way that an upper portion 15 of it (configured to make contact with the bottom wall 3 of the tray 2) is retracted relative to the bottom surface 9 so that it does not touch the bottom wall 3 of the tray 2. In contrast, in other embodiments, each ejector 14, in the disengaged position, may be retracted in such a way as to constitute, with its upper portion 15, a continuation of the bottom surface 9, therefore defining a resting surface for the tray 2 which operates in conjunction with the bottom surface 9. Depending on the embodiments, when it is in the disengaged position, each ejector 14 may either be completely extracted from the housing 7 or partly still inserted in it.

In particular, the ejectors 14 may be plate-shaped, that is to say, extend mainly two-dimensionally, and extend in a plane perpendicular to the reference plane, advantageously vertical. In the case of a plate shape, such as the shape in the embodiment illustrated, the thickness is small relative to the other two dimensions.

In the embodiment illustrated in FIGS. 7 to 10, in which the sliding holes 12 have an elongate slot shape and in which the ejectors 14 are plate-shaped, the ejecting device 13 allows optimum tray 2 stability to be achieved even if a food product 25 with a relatively large mass is present inside the tray 2.

The upper portions 15 of the one or more ejectors 14, in the engaged position, altogether define a resting plane for the tray 2 which is advantageously horizontal and parallel to the reference plane.

Moreover, in one particular embodiment, at least one of the ejectors 14 (advantageously all of those present) also has a guide portion 16 whose function is to facilitate positioning of the tray 2 over the shaped mould 8 and on the upper portions 15 of the ejectors 14, when the tray 2 is fed into that position by sliding in a plane parallel to the resting plane (preferably coplanar) starting from a feed zone adjacent to the shaped mould 8. The guide portion 16 is alongside the respective upper portion 15 and is shaped so that it is inclined, in such a way as to increase its distance from the resting plane moving away from the respective upper portion 15 (FIG. 7). When the ejectors 14 are in the engaged position, the guide portions 16 present (one or more based on how many ejectors 14 are provided with them) altogether define a sliding plane for the tray 2, which is inclined relative to the resting plane and along which the tray 2 can move during sliding from the feed zone until over the shaped mould 8. The sliding plane therefore acts as a guide for correct positioning of the tray 2 and to avoid tray 2 jamming against the ejectors 14. In the preferred embodiments, the sliding plane is inclined relative to the resting plane by an angle greater than 180° and less than 225°, preferably between 190° and 210°. That angle is the one measured between the sides of the resting plane and of the sliding plane intended to make contact with the tray 2 (those on top in the accompanying figures).

According to a third inventive aspect of this invention, in order to cool the tray 2 during application of the plastic film 26, the sealing machine 1 also comprises a cooling system 17 for cooling the shaped mould 8. Thanks to the fact that the shaped mould 8 is in contact with the outer surface of the tray 2, by cooling the shaped mould 8 it is indeed possible to remove heat from the bottom wall 3.

The cooling system 17 comprises a chiller 18, where, in the known way, chiller 18 means a thermal machine which removes heat from a cooling fluid by using a refrigeration cycle, and a plurality of ducts 19 (shown in cross-section in particular in FIGS. 4 and 5) which are in fluid communication both with each other and with the chiller 18. Advantageously, the ducts 19 extend inside the shaped mould 8 and are connected to each other to define a flow path 20 inside which, in use, the cooling fluid flows. In the embodiment illustrated the ducts 19 are hollowed out directly in the material of which the single body is constituted; moreover, inserted in them are suitable plugging elements 21 to define the flow path 20 and to prevent the cooling fluid from coming out.

The flow path 20 extends from an infeed section 22, through which the cooling fluid enters the flow path 20, to an outfeed section 23, which the cooling fluid reaches after having circulated inside the flow path 20, and from which it exits the shaped mould 8. The chiller 18, which is connected to the plurality of ducts 19, feeds the chilled cooling fluid to the ducts 19 and to the flow path 20, and is configured to cool the cooling fluid bringing it to a temperature equal to or less than 10° C., preferably equal to or less than 8° C., and even more preferably equal to or less than 6° C. or 4° C.

In a preferred embodiment, the chiller 18 is connected to the flow path 20 both at the infeed section 22, and at the outfeed section 23 in such a way as to be connected to the flow path 20 defined by the ducts 19 in a closed loop; indeed the chiller 18 feeds the chilled cooling fluid to the flow path 20 through the infeed section 22 and receives the "hot" cooling fluid coming out of the outfeed section 23. Preferably the chiller 18 will be placed at a distance from the sealing machine 1 (for example outside the building in which the sealing machine 1 is installed), therefore there will be ducts 19 present which put the chiller 18 in fluid communication both with the infeed section 22, and with the outfeed section 23.

In accordance with this invention, the flow path 20 defined by the plurality of ducts 19 inside the shaped mould 8, preferably always extends at least below the bottom surface 9. In the embodiments such as that illustrated in the accompanying figures, in which the housing 7 of the shaped mould 8 also has at least one lateral surface 10 configured to make contact with at least one lateral wall 4 of the tray 2, the flow path 20 defined by the plurality of ducts 19 advantageously extends, not just below the bottom surface 9, but also around the lateral surface 10 in such a way as to also cool this surface in the best possible way; in this case the ducts 19 extend at different heights.

For example, in the embodiment in the accompanying figures, the ducts 19 mainly extend in two planes which are parallel to the reference plane: a first group of ducts 19 extends in a first plane placed below the bottom surface 9 and defines a coil 24 (see FIG. 4), whilst a second group of ducts 19 extends in a second plane placed at an intermediate height relative to the total height of the lateral surface 10 (see FIG. 5). The ducts 19 of the first group are connected to the ducts 19 of the second group, at the ends of the coil 24, by means of two connecting ducts 19 which extend vertically.

Connected to the ducts 19 of the second group are both the infeed section 22 and the outfeed section 23, which also extend vertically (they lead to the lower face of the mould). In this embodiment, as shown in FIG. 7, the chiller 18 feeds the appropriately cooled cooling fluid to the flow path 20 through the infeed section 22; the cooling fluid, after having travelled through two ducts 19 of the second group, is conveyed to the ducts 19 of the first group, where it follows the flow path 20 in the shape of a coil 24; then it is returned to the height of the second plane where it follows the remaining ducts 19 of the second group until it reaches the outfeed section 23, from which it is redirected to the chiller 18 by following the closed loop.

The following is a description of the method for packaging a food product 25 according to this invention. That method may advantageously be implemented using the various embodiments of the sealing machine 1 according to this invention described above.

First, it comprises a picking up step in which a preformed tray 2 is picked up, preferably made by thermoforming, of the type previously described.

Therefore, as already indicated, the tray 2 comprises at least one layer of plastic material and at least a bottom wall 3 is identifiable in it, usually configured to receive the food product 25.

Similarly to the prior art methods, even the method according to this invention comprises a placing step, in which the food product 25 (not illustrated in the accompanying figures) is positioned on the tray 2, in particular on the bottom wall 3 of the tray 2, and a sealing step, in which the heated plastic film 26 is applied over the tray 2 and the food product 25 contained in it, in such a way that the food product 25 is located between the tray 2 below and the plastic film 26. During the sealing step the plastic film 26 is fixed to the tray 2 to seal the space present between it and the tray 2 in which the food product 25 is present; in the case of packaging with the skin packaging technique the plastic film 26 is made to adhere both to the tray 2, and to the food product 25 in such a way that it follows the shape of the surface.

According to an innovative aspect of this invention, the method also comprises a cooling step, which is carried out simultaneously with the sealing step previously described, and during which heat is removed from at least the bottom wall 3 of the tray 2, by acting on the outside of the tray 2.

In accordance with one particular embodiment according to this invention, the method comprises a positioning step which is preferably carried out after the placing step, and in which the tray 2, inside which the food product 25 may already be present, is inserted in a housing 7 which is defined by a shaped mould 8 and which has a bottom surface 9. In accordance with a further innovative aspect of this invention, the positioning step is carried out using a shaped mould 8 in which the bottom surface 9 of the housing 7 is fixed relative to the rest of the shaped mould 8, and the tray 2 is positioned in such a way that the bottom wall 3 of the tray 2 is in contact with the bottom surface 9.

The method also comprises a heating step, which is carried out before the sealing step, during which the plastic film 26 is heated in order to allow it to be fixed to the tray 2 and, if necessary, adhesion both on the tray 2 and on the food product 25 (thermoforming with skin effect).

In one embodiment the cooling step (as already indicated, carried out simultaneously with the sealing step) is also carried out by cooling the shaped mould 8 to remove heat from the bottom wall 3 of the tray 2 by means of the contact between the bottom wall 3 of the tray 2 and the cooled bottom surface 9 of the housing 7. Indeed, advantageously, cooling of the shaped mould 8 causes cooling of the bottom surface 9 of the housing 7; in turn cooling of the bottom surface 9 causes, by conduction, cooling of the bottom wall 3 of the tray 2 with which it is in contact.

For that purpose, in a preferred embodiment, the housing 7 has a shaped inner surface, which includes the bottom surface 9, which substantially follows the shape of the outer surface of the bottom wall 3 of the tray 2.

If the lateral surface 10 and if necessary the top surface 11 (as defined above) are also present, the shaped inner surface of the housing 7 may also follow the outer surface of the lateral 4 and, if necessary, of the upper flange 5 of the tray 2.

Advantageously, the sealing step is carried out by using skin packaging technology, whose features are known to experts in the sector, since they are similar to those of the skin packaging normally used in the prior art; therefore they are not described in detail herein.

This invention brings important advantages.

Indeed, this invention provides both a sealing machine and a method for packaging a food product which allow the use of preformed trays with a thickness of the material of which they are constituted that is significantly less than what is possible with the currently known solutions, even in the case of packaging using skin packaging technology.

Finally, it should be noticed that this invention is relatively easy to produce and that even the cost linked to implementing the invention is not very high. The invention described above may be modified and adapted in several ways without thereby departing from the scope of the inventive concept.

All details may be substituted with other technically equivalent elements and the materials used, as well as the shapes and dimensions of the various components, may vary according to requirements.

The invention claimed is:

1. A sealing machine for sealing with a plastic film a tray on which a food product is present, the tray being pre-formed, comprising at least one layer of plastic material and having a bottom wall; the sealing machine comprising:
   a supporting element which defines a housing configured to receive in use the tray;
   a closing element associated with the supporting element, which is movable, relative to the supporting element, between an operating position, in which the closing element is coupled to the supporting element, and a non-operating position, in which the closing element is uncoupled from the supporting element; and
   an ejecting device associated with the housing of the supporting element and configured to eject in use the tray from the housing;
wherein:
   the supporting element is constituted of a shaped mould;
   the housing has a bottom surface suitable for making contact, in use, with the bottom wall of the tray;
   the sealing machine further comprising a cooling system configured for cooling the shaped mould when the tray is in the housing, the cooling occurring simultaneously with a tray sealing operation of the sealing machine, the cooling system comprising a chiller and a plurality of ducts, the ducts of the plurality of ducts being in fluid communication with each other, extending inside the shaped mould and defining a flow path for a cooling fluid, the flow path extending from an infeed section to an outfeed section, wherein the chiller is connected to the plurality of ducts for feeding those ducts with the cooling fluid and is configured to cool the cooling fluid bringing it to a temperature equal to or less than 10° C.;
   the bottom surface of the housing is fixed relative to the rest of the shaped mould;
   one or more sliding holes are made in the shaped mould at the bottom surface; and
   the ejecting device comprises one or more ejectors, at least one of which is fitted in each of said one or more sliding holes, each of said one or more ejectors being movable between a disengaged position, in which the ejector allows the tray to be received in the housing, and an engaged position, in which the ejector prevents the tray from being received in the housing.

2. The sealing machine according to claim 1 wherein the housing has a shaped inner surface which comprises the bottom surface and which is shaped in such a way that it substantially follows an outer surface of the tray which must be received in the housing.

3. The sealing machine according to claim 2 wherein the shaped mould is constituted of a single body made of aluminium-based material.

4. The sealing machine according to claim 2 wherein the housing has at least one lateral surface suitable for making contact, in use, with at least one lateral wall of the tray; wherein moreover the ducts of the plurality of ducts extend below the bottom surface of the housing and around the lateral surface of the housing.

5. The sealing machine according to claim 1 wherein the housing has a width and a length which define a reference plane, and wherein projecting the one or more sliding holes and the bottom surface on the reference plane, the projections of the sliding holes on the reference plane occupy altogether an area equal to or less than 7% of an area occupied by the projection of the bottom surface on the reference plane.

6. The sealing machine according to claim 5 wherein the shaped mould is constituted of a single body made of aluminium-based material.

7. The sealing machine according to claim 5 wherein the housing has at least one lateral surface suitable for making contact, in use, with at least one lateral wall of the tray; wherein moreover the ducts of the plurality of ducts extend below the bottom surface of the housing and around the lateral surface of the housing.

8. The sealing machine according to claim 1 wherein each ejector is movable from the disengaged position to the engaged position along a substantially vertical ejecting line.

9. The sealing machine according to claim 1 wherein said sliding holes have a slot-shaped cross-section and each ejector is plate-shaped.

10. The sealing machine according to claim 1 wherein each ejector in the engaged position is projecting inside the housing relative to the bottom surface and in the disengaged position is retracted outside the housing relative to the bottom surface.

11. The sealing machine according to claim 1 wherein the housing has at least one lateral surface suitable for making contact, in use, with at least one lateral wall of the tray; wherein moreover the ducts of the plurality of ducts extend below the bottom surface of the housing and around the lateral surface of the housing.

12. The sealing machine according to claim 1 wherein the chiller is in fluid communication both with the infeed section for sending the cooling fluid to it, and with the outfeed section for receiving the cooling fluid from it, and wherein the cooling fluid flows in a closed loop between the chiller and the plurality of ducts.

13. The sealing machine according to claim 1 wherein the shaped mould is constituted of a single body made of aluminium-based material.

14. The sealing machine according to claim 1, wherein each of said one or more ejectors has an upper portion configured to make contact with the bottom wall of the tray, the upper portions of the one or more ejectors in the engaged position altogether defining a resting plane for the tray, wherein at least one of said one or more ejectors also has a guide portion, which is alongside the respective upper portion and which is shaped in such a way as to increase its distance from the resting plane moving away from the respective upper portion, and wherein in the engaged position the guide portions of the one or more ejectors altogether define a sliding plane for the tray which is inclined relative to the resting plane and along which the tray can move during sliding from a feed zone over the shaped mould.

15. The sealing machine according to claim 1 wherein the chiller is connected to the plurality of ducts for feeding those ducts with the cooling fluid and is configured to cool the cooling fluid bringing it to a temperature equal to or less than 6° C.

16. A method for packaging a food product in a container which comprises a tray comprising at least one layer of plastic material, and a plastic film applied to the tray, the method comprising the following steps:
   a picking up step, in which a pre-formed tray is picked up;
   a placing step in which a food product is placed on a bottom wall of the tray; and a sealing step, in which a heated plastic film is applied over the tray and the food product and fixing the plastic film to the tray to seal the food product between the tray and the plastic film;

further comprising a cooling step in which by acting on the outside of the tray, heat is removed from at least the bottom wall of the tray, and wherein the cooling step is carried out simultaneously with the sealing step;

the method further comprising the following steps:

a positioning step, in which the tray is inserted in a housing defined by a shaped mould, putting the bottom wall of the tray in contact with a bottom surface of the housing, the positioning step being carried out using a shaped mould in which the bottom surface of the housing is fixed relative to the rest of the shaped mould; and a heating step which is carried out before the sealing step, and in which the plastic film is heated;

wherein moreover the cooling step is carried out by cooling the shaped mould to remove heat from the bottom wall of the tray by means of the contact between the bottom wall and the bottom surface.

17. The method according to claim 16 wherein the positioning step is carried out using a mould in which the housing has a shaped inner surface which comprises the bottom surface and which is shaped in such a way that it substantially follows an outer surface of the tray.

18. The method according to claim 16 wherein a tray constituted of a sheet of plastic material is used which comprises the layer of plastic material and which has a thickness of less than 500 μm.

19. The method according to claim 16 wherein the sealing step is carried out by using skin packaging technology.

20. The method according to claim 16 wherein the tray constituted of a sheet of plastic material is used which comprises the layer of plastic material and which has a thickness of less than 350 μm.

* * * * *